United States Patent [19]

van Baardwijk et al.

[11] Patent Number: 4,811,335

[45] Date of Patent: Mar. 7, 1989

[54] BROADBAND/NARROW-BAND SWITCHING NETWORK OF THE TIME-SPACE-TIME TYPE AND TIME AND SPACE SWITCHING STAGES FOR BROADBAND/NARROW-BAND CHANNELS

[75] Inventors: Johannes van Baardwijk; Marinus A. Bos, both of Eindhoven, Netherlands

[73] Assignee: AT&T and Philips Telecommunications B.V., Hilversum, Netherlands

[21] Appl. No.: 21,327

[22] Filed: Mar. 3, 1987

[30] Foreign Application Priority Data

Mar. 10, 1986 [NL] Netherlands ......................... 8600614

[51] Int. Cl.$^4$ ........................................... H04Q 11/04
[52] U.S. Cl. ...................................... 370/63; 370/58; 379/15
[58] Field of Search ..................... 370/58, 60, 63, 62, 370/64, 59, 3, 1; 379/15 W, 15

[56] References Cited

U.S. PATENT DOCUMENTS

| | | | |
|---|---|---|---|
| 4,143,242 | 3/1979 | Horiki | 370/58 |
| 4,257,119 | 3/1981 | Pitroda | 370/58 |
| 4,344,170 | 8/1982 | Arita | 370/59 |
| 4,399,534 | 8/1983 | Simmons et al. | 370/58 |
| 4,525,834 | 6/1985 | Shenkel et al. | 370/3 |
| 4,564,936 | 1/1986 | Takahashi | 370/58 |
| 4,706,242 | 11/1987 | Harland | 370/60 |
| 4,715,026 | 12/1987 | Eberspaeches | 370/1 |

Primary Examiner—M. H. Paschall
Attorney, Agent, or Firm—Lucian C. Canepa

[57] ABSTRACT

The invention relates to a switching system for a broadband ISDN-network by means of which signals can be transmitted with a large variety of bit rates. In addition to 64 kbit/s, 144 kbit/s and 2 Mbit/s narrow-band channels for inter alia telephony, data, video-information broadband channels for, for example, broadcast-TV having bit rates from 35-70 Mbit/s are switched through. For both signal catagories, a common switching system of the TST-type is utilised, which avoids the necessity of providing a multiplexer for each subscriber. The control of the time switching stages and the space switching stage forming part of the switching system is divided in a control for the broadband channels and a control for the narrow-band channels. Thus, a simple, effective control of the switching system is realised which operates at a low rate whenever possible.

7 Claims, 4 Drawing Sheets

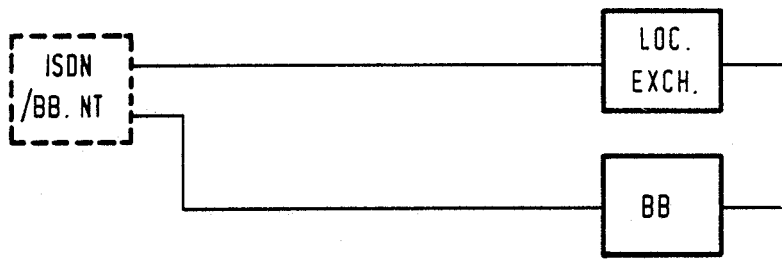
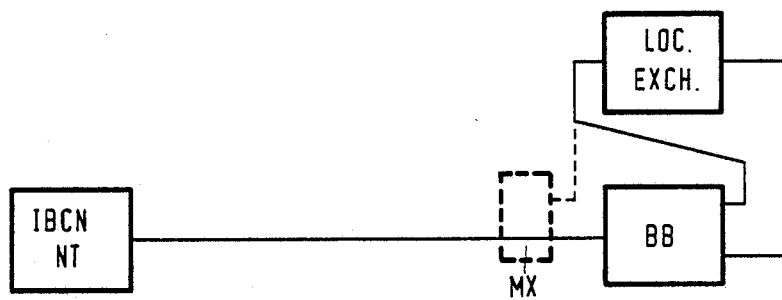
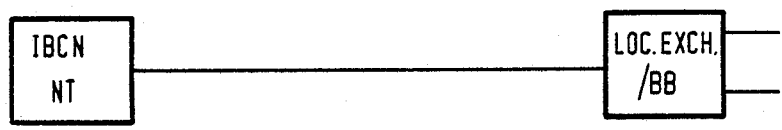
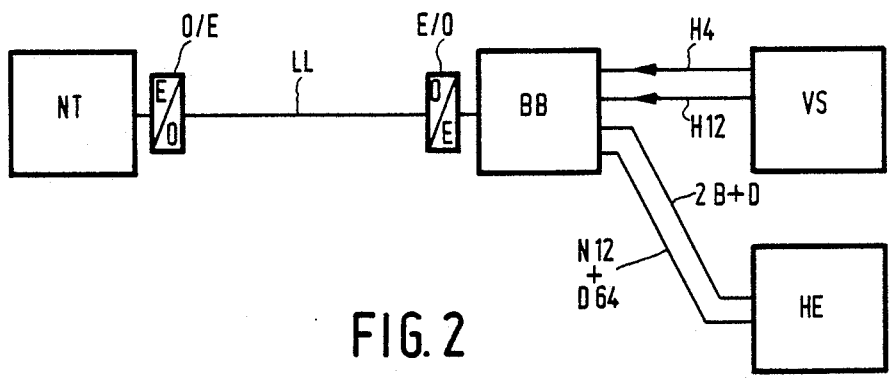

BROADBAND/NARROW-BAND SWITCHING NETWORK OF THE TIME-SPACE-TIME TYPE AND TIME AND SPACE SWITCHING STAGES FOR BROADBAND/NARROW-BAND CHANNELS

The invention relates to a switching system for broadband and narrow-band channels, broadband and narrow-band signals being applied to an input end of the switching system and a time-division multiplex signal which can accommodate a plurality of broadband channels and one or more narrow-band channels being generated at an output end of the switching system.

BACKGROUND OF THE INVENTION

A telecommunication system including a switching system for distributing broadband channels, for example broadcast-TV-channels, and for switching broadband (for example video-phone) and narrow-band channels (for example telephone) is disclosed in the published European Patent Application No. EP 0,071,057. The switching system described there includes a space-division multiplex stage to show input the broadband and narrow-band channels are applied. A signal which—in time-division multiplex—comprises at least two broadband channels and one narrowband channel becomes available at the output of the switching system. Using such a system, a multiplexer is not required for each individual subscriber, which allows a significant saving in equipment.

SUMMARY OF THE INVENTION

The present invention has for its object to provide a switching system in which both the broadband and the narrow-band channels utilise the same switching system, but in which the control for each type of channels is separate. The invention provides a switching system for broadband and narrow-band channels as set forth in the opening paragraph, characterized in that the switching system includes one or more ingoing time switching stages, that each time switching stage includes a first data store and first routing memory coupled thereto for switching-through in time-division multiplex broadband signal sources connected to inputs of the first data store, that each time switching stage includes a second data store and a second routing memory connected thereto for switching-through and multiplexing into a broadband channel narrow band signal sources connected to inputs of the second data store, that outputs of the second data store are connected to second inputs of the first data store for switching in time-division multiplex the narrow-band channels multiplexed into broadband channels together with the broadband channels connected to the first inputs, that the switching system further includes one or more space switching stages connected to outputs of the ingoing time switching stages for switching through in space-division multiplex the time-division multiplex signal originating from the ingoing time switching stages, and that the switching system includes an outgoing time switching stage connected to outputs of the space switching stages for switching in time-division multiplex the signals originating from the space switching stage.

The invention has the advantage that the control for the narrow-band channels need not be as fast (up to a factor of approximately 300) as the control for the broadband channels. A further advantage is that, as is also the case in the system described in the above-mentioned European Patent Application No. EP 0.071,057, a multiplexer is not required for each individual subscriber.

An embodiment of the invention and its advantages will now be described, by way of example, with reference to the accompanying drawings, in which:

BRIEF DESCRIPTION OF THE DRAWINGS

FIGS. 1a to 1d are an illustration of the anticipated evolution of the ISDN to IBCN (Integrated Broadband Communication Network), the invention providing a switching system for the latter network concept;

FIG. 2 is a circuit diagram of the telecommunication traffic and the composition of that traffic in an IBCN network according to the invention;

DETAILED DESCRIPTION

Figure 3:
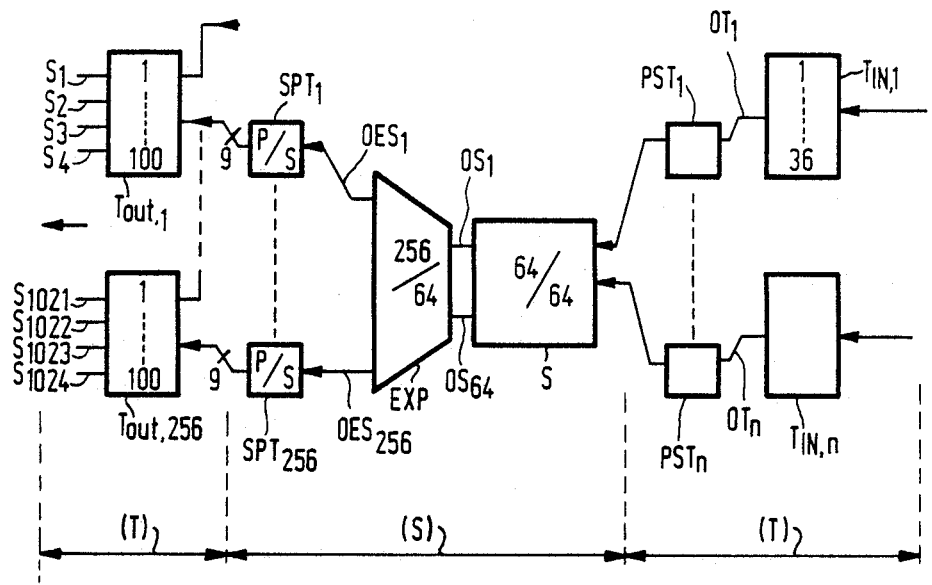
FIG. 3 shows a switching system of the time-space-time type according to the invention.

Digitising the telephone network opened the possibility of providing a greater diversity of services to the subscribers. In addition to the transmission of telephone traffic in circuit-switched 64 kbit/s channels, the possibility of utilising the network also for data traffic was created. The what is commonly referred to as the Integrated Service Digital Network (ISDN) became possible. For the transmission between the subscriber's terminal (telephone set/data terminal), more specifically the terminal circuit ISDN NT, and the (terminal) exchange (LOC.EXCH.), use is made of existing 2-wire or 4-wire copper wire connections (FIG. 1a).

Gradually, the need was felt for channels having a much higher bit rate than 64 kbit/s: more specifically 35–70 Mbit/s channels for broadcast-TV and also 2–8 Mbit/s video channels for, for example, conference television. For the transmission of such broadband signals optical fibres can be used. In the first instance broadband optical fibre networks can be installed next to the existing copper wire networks, a broadband switching system (BB) being introduced in addition to the conventional switching system (LOC.EXCH.) at 64 kbit/s ("overlay"). At the subscriber's end the network can be terminated by means of a combined ISDN-/broadband terminal circuit (ISDN/BB NT, FIG. 1b). In the future this evolution might result in the signals transmitted via copper wires then being transmitted through the optical fibre, as the channel capacity extension on the fibre this entails is insignificant. The two exchanges (LOC.EXCH. and BB) can then be connected via a multiplexer MX to the common optical fibre. It may, however, be assumed that the ISDN (terminal) exchange LOC.EXCH. will in its totality be connected to the input of the broadband switching network BB in addition to the true broadband TV and video channels to be switched (FIG. 1c). The multiplexer MX then becomes superfluous. In the long run the distinction between the switching system for the ISDN (terminal) exchange and the switching system for broadband may gradually disappear and an integrated broadband terminal exchange LOC.EXCH./BB would then take its place (FIG. 1d).

In view of this evolution and more specifically the last phase thereof, it is necessary to develop a broadband switching network which is suitable both for switching the conventional, interactive 64 kbit/s telephone and data channels and distributive broadband TV channels (for example 70 mbit/s) and interactive channels, for example 2 or 8 Mbit/s video, music and data channels.

The services which can be performed with the aid of a broadband network and a possible structure thereof are shown schematically in FIG. 2. A plurality of broadcast-TV and video sources VS are connected to the broadband switching system BB. The appropriate services are the normal broadcast-TV, pay television, video-telephony, video-library, electronic newspaper, etc. The bandwidth of the channels varies between 54 Mbit/s (or 70 Mbit/s) for broadcast-TV (the H4-channels) to 2 Mbit/s for video conferences (H12-channels). In addition, an ISDN exchange HE is connected to the broadband switching system BB. The exchange HE applies, for example, 30.B+D64 channels and a number of 2B+D16 channels (30×64 kbit/s+64 kbit/s and 2×64 kbit/s+16 kbit/s, respectively) to the broadband switching system BB. The switched signals are transmitted to the opto-electrical converter O/E of the subscriber's terminal NT via an electro-optical converter E/O and an optical fibre LL.

FIG. 3 shows a broadband switching system for 1024 subscriber terminals. The switching system has what is commonly referred to as a TST (time-space-time) configuration. The ingoing time switching stages $T_{in,i}$ are arranged for switching (i.e. exchanging time slots) of 36 channels of 34 Mbit/s (H4) each. For example 32 out of these 36 channels are directly supplied by broadband signals (for example broadcast-TV), whilst the remaining four channels are utilised for the low-bit rate channels H12 (pronounced H one two), B, D64 and D16.

Figure 4:
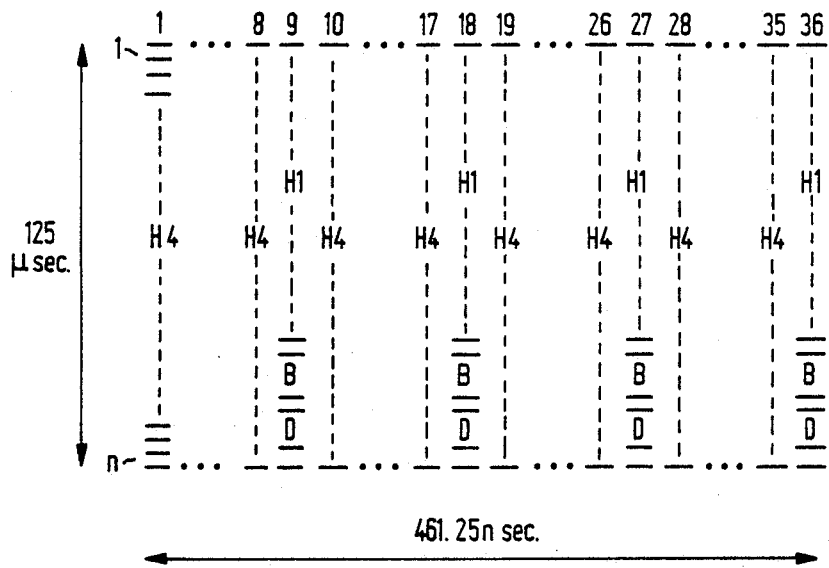
FIG. 4 shows an arrangement according to the invention of frame and sub-frame of the time-division multiplex signal to be switched.

A time frame comprises 36 time slots, the frame length is 461.25 nsec. A super frame comprises 271 frames and has a duration of 125 μsec. As 32 time slots per frame are reserved for the H4 channels, 1084 (4×271) time slots are available in each super frame for the 125 μsec. related channels such as H12, B, D64 and D16. These channels are distributed over the 1084 channels as required, for example, in a manner as shown in FIG. 4. Thus, the time slots 9, 18, 27 and 36 of each frame are reserved for the low-rate channels, a sub-division having been made within each super frame for one or several H12/30B, B and D-channels.

The further implementation of one of the ingoing time switching stages $T_{in}$ will be described in greater detail with reference to FIG. 5.

The outgoing multiplex lines OT of the n time switching stages $T_{in}$ are connected to a space switching system S (FIG. 3), by means of which the time slots on the incoming multiplex lines are switched through to the desired outgoing multiplex line by the space switching network S. The structure of the space switching network S will be described in detail with reference to FIG. 6.

The outgoing multiplex lines of the space switching network S are connected to the outgoing time switching stages $T_{out}$. In the example shown in FIG. 3 this is effected via an extension network EXP (1:4). The time switching stages $T_{out}$ route the incoming time slots to the desired subscribers, which are connected to the outputs $S_1, S_2, \ldots S_{1024}$ of the time switching stages $T_{out}$. Furthermore, inter alia the broadcast TV channels can be connected additionally to the time switching stages $T_{out}$, which channels are distributed by the time switching stages $T_{out}$ to the desired output. The details will be described with reference to FIG. 7.

Figures 5, 6:
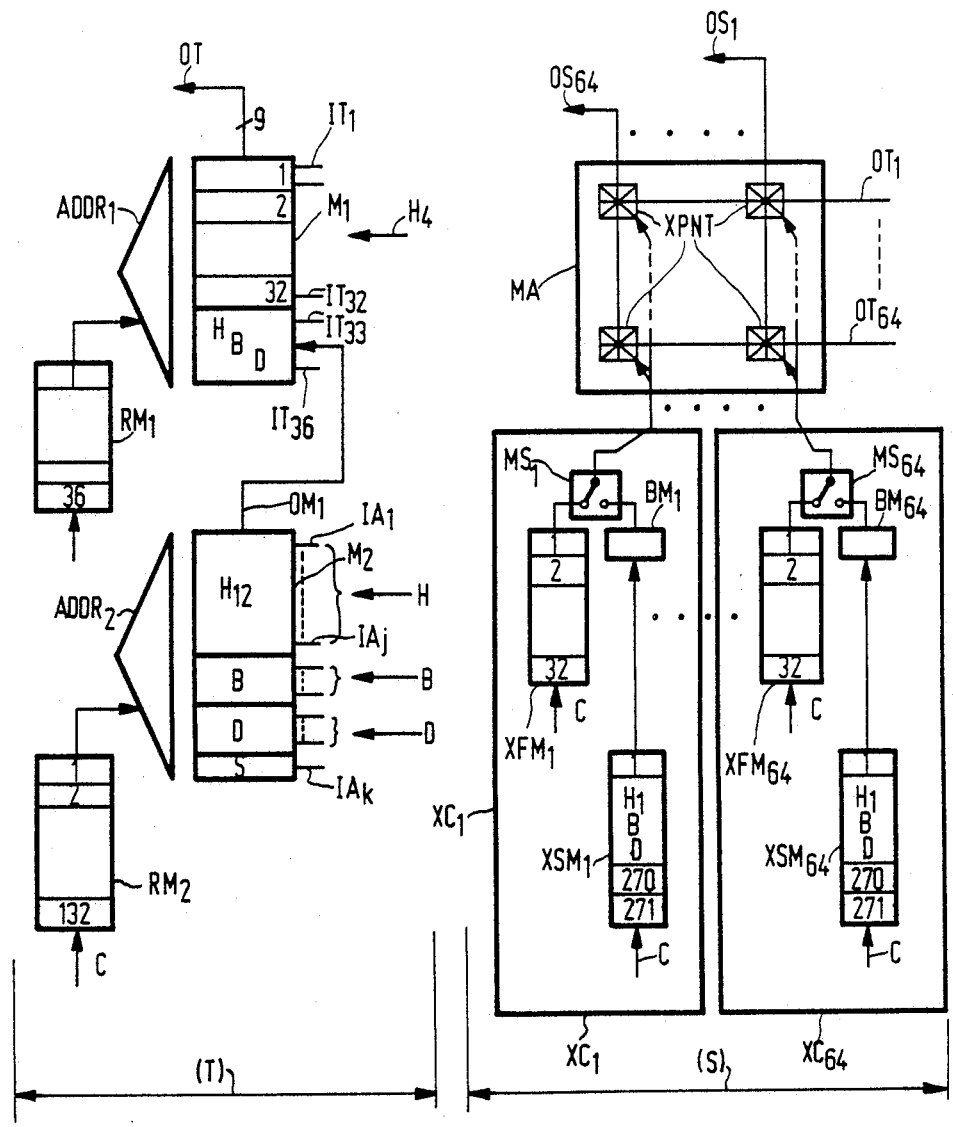
FIG. 5 shows an ingoing time switching stage according to the invention.
FIG. 6 shows a space switching stage according to the invention.

FIG. 5 shows an embodiment of one of the n ingoing time switching stages $T_{in}$ as shown in FIG. 3. The time stage $T_{in}$ includes a first, high-bit rate time switching stage having a data store $M_1$ and being controlled by an address arrangement $ADDR_1$ and a routing memory $RM_1$. Thirty-two channels of the H4 type are connected to the inputs $IT_1 \ldots IT_{32}$. These channels (34 Mbit/s) are more specifically intended for video information (conference TV, TV-programs having low audience figures, such as documentaries). The outputs $OM_1$ of a data store $M_2$ of a second, low-bit rate time switching stage are connected to the other four channels $IT_{33} \ldots IT_{36}$ of the data store $M_1$. The second data store $M_2$ is controlled by an addressing arrangement $ADDR_2$ and a routing memory $RM_2$. The second rate store $M_2$ has inputs for a plurality of H12, B and D channels. The exact number of these channels depends on the desired distribution over the number of H12 channels (1.92 Mbit/s), the number of 30B+D64 channels, the number of B channels (2×64 kbit/s) and the number of D channels (16 or 64 kbit/s). As was already remarked in the description of FIG. 4, a super frame comprises 271 frames of 36 time slots each. Consequently, in each super frame 271.(36−32)=1084 time slots are available for H12, B, D64 data channels.

The first, high-rate time switching stage switches the information present in the (36) memory locations of the data store $M_1$ through to the desired time slots in one of the outgoing multiplex lines OT under the control of the information stored in the routing memory $RM_1$. In this situation the routing memory $RM_1$ passes in a frame period (461.25 nsec) through all its (36) locations. The information stored in a given location of the routing memory $RM_1$ then determines the address of the location in the data store $M_1$.

The second, low-bit rate time switching stage switches the information contained in the memory locations of the data store $M_2$ on to an outgoing multiplex line $OM_1$ under the control of the information stored in the routing memory $RM_2$. The routing memory $RM_2$ then passes through all its locations in a super frame period (125 μsec).

The channels coming from the time slots switched in the second time switching stage are applied to the four specific inputs $IT_{33}$–$IT_{36}$ of the first switching stage $M_1$ and are switched by this first time switching stage together with the other 32 H4 channels to the desired time slot in the outgoing multiplex line OT. Each of the multiplex lines OT is in the form of a bundle of parallel wires, one wire of the bundle being utilised for each bit of the word located in one time slot. The example described here is based on 9-bit words. Consequently, the multiplex lines OT will each contain 9 parallel wires. The bit rate on the multiplex lines OT is approximately 78 Mbit/s; on the (four) internal multiplex lines $OM_1$ this rate is only approximately 8.6 Mbit/s.

The multiplex lines OT are applied to the space switching network S via parallel/series converters $PST_1 \ldots PST_n$ (FIG. 3).

The space switching network S (FIG. 6) includes a square matrix MA of cross-point switches XPNT. In the embodiment 64 columns of 64 cross-point switches each are provided. The outgoing multiplex lines $OT_1, \ldots OT_{64}$ of the time switching stages $T_1$ are each connected to a row of stitches XPNT of matrix MA. The cross-points associated with one column are controlled by a cross-point control $XC_1, XC_2, \ldots XC_{64}$. The cross-point control XC comprises a first cross-point table memory $XFM_1$, a second cross-point table memory $XSM_1$ and a change-over switch $MS_1$. The fixed contact of change-over switch $MS_1$ is connected to the cross-points of the relevant column. The first change-over contact of change-over switch $MS_1$ is connected to the first cross-point table memory $XFM_1$, whilst the second change-over contact is connected to the second cross-point table memory $XSM_1$ via a buffer memory $BM_1$. The time slots from the (32) H4-channels are switched by the relevant column of the space-switching system S under the control of the first cross-point table memory, whilst the other channels (H12, B, D64, D16) are switched by the relevant column of the space switching system S under the control of the second cross-point table memory $XSM_1$. The cross-point to be closed by means of an appropriate drive of switch $MS_1$ is determined on the basis of the read value originating either from the first cross-point table memory $XFM_1$ or from the second cross-point table memory $XSM_1$. As is also the case for the time switching stages $T_{in}$, the rate at which the information is read from the first table $XFM_1$ (78 kbit/s) is much higher than the rate at which the information from the second table is read (8.6 Mbit/s).

The time slots thus dynamically switched by the crosspoint controls $XC_1, XC_2, \ldots XC_{64}$ appear on the outgoing space multiplex lines $OS_1, OS_2, \ldots OS_{64}$.

The outgoing multiplex lines $OS_1, \ldots OS_{64}$ of the space switching network S (FIG. 3) are applied to an expansion network EXP. Using this network, which has an expansion factor of 1:4, the multiplex lines $OES_1$, $OES_2, \ldots OES_{256}$ are applied via seriesparallel converters $SPT_1, SPT_2, \ldots SPT_{256}$ to inputs of the ($4 \times 64 = 256$) outgoing time switching stages $T_{out,1}$, $T_{out,2}, \ldots, T_{out,256}$.

Figure 7:
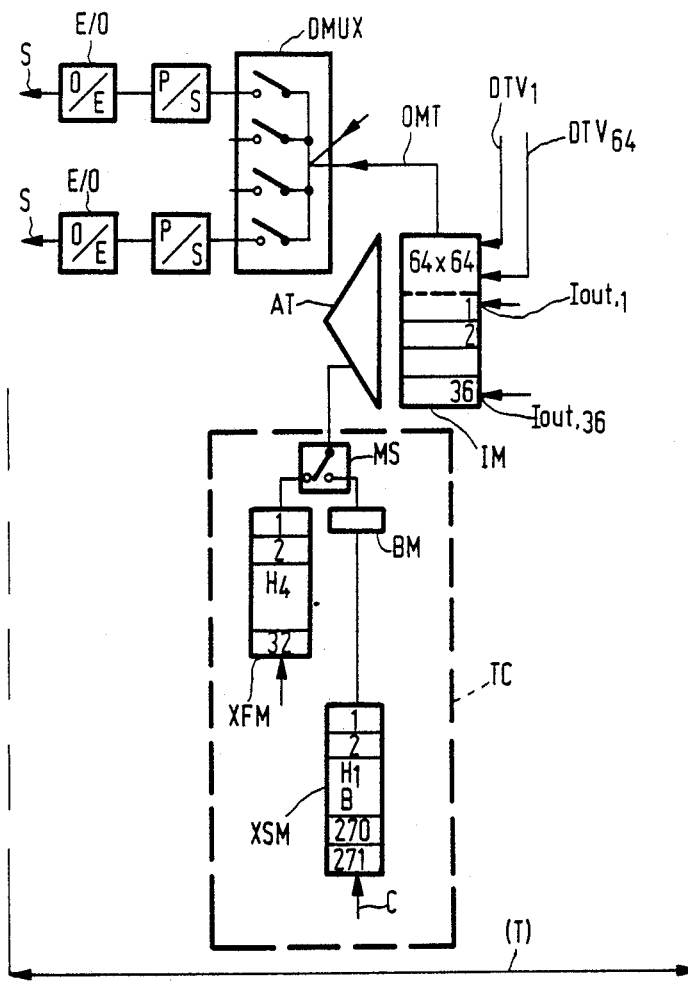
FIG. 7 shows an outgoing time switching stage according to the invention.

A time switching stage associated with the outgoing time switching network $T_{out}$ is shown in FIG. 7.

The time switching stage $T_{out}$ includes an information memory IM (FIG. 7) having 36 inputs $I_{out,1}, \ldots I_{out,36}$ for the connection of 36 multiplex lines (OES, FIG. 3) originating from the space switching system S. In addition, the information memory M has a number of inputs $DTV_1, DTV_2, \ldots$, for example 64, for connection of a like number of broadcast TV sources. The inputs $DRV_1, \ldots DTV_{64}$ for the broadcastTV sources of all the outgoing time switching stages $T_{out,1}, \ldots T_{out,256}$ are arranged in parallel, as a result of which the possibility of signals for broadcast TV having a large audience being blocked can be made equal to zero. The information store IM is read under the control of a time slot control TC and an addressing arrangement AT. The time slot control TC is arranged in a manner similar to the cross-point control XC described with reference to FIG. 6, consequently no further description will be provided. The information components stored in the table memories XFM and XSM determines which 36 time slots (from the maximum number of 36+64 time slots) will be read per frame period and become available on the output multiplex line OMT. The outgoing multiplex line OMT is connected to a demultiplexer DMUX, by means of which the incoming signal is demultiplexed into four portions. Each of the four subscribers S connected to one demultiplexer receives 8 H4 channels and also 4 H12 channels and one 2B+D16-channel from the total of 32 H4-channels, and 4 mixed (H12, B, D) channels. This represents a bit rate on the subscribers line of $9 \times 354.688 = 312$ Mbit/s.

We claim:

1. A switching system for broadband and narrow-band channels, broadband and narrow-band signals being applied to an input end of the switching system and a time-division multiplex signal which can accommodate a plurality of broadband channels and one or a plurality of narrow-band channels being generated at an output end of the switching system, characterized in that the switching system includes one or more ingoing time switching stages, that each time switching stage includes a first data store and a first routing memory coupled thereto for through-switching, in a time-division multiplex format, broadband signal sources connected to the inputs of the first data store, that said first data store and said first routing memory operate at a relatively high signal bit rate, that each time switching stage includes a second data store and a second routing memory connected thereto for through-switching and multiplexing into a broadband channel narrow-band signal sources connected to inputs of the second data store, that said second data store and said second routing memory operate at a relatively low signal bit rate, that outputs of the second data store are connected to second inputs of the first data store for switching, in a time-division-multiplex format, the narrow-band channels multiplexed into broadband channels together with the broadband channels connected to the first inputs, that the switching system further includes one or more space switching stages connected to outputs of the ingoing time switching stages for through-switching, in a space-division-multiplex format, the time-division multiplex signal originating from the ingoing time switching stages, and that the switching system includes an outgoing time switching in time-division multiplex the signals originating from the space switching stage.

2. A switching system for broadband and narrow-band channels as claimed in claim 1, characterized in that the space switching stages each include a square matrix of cross-points, the inputs of the matrix rows being connected to the outputs of the ingoing time switching stages, that each column of cross-points comprises a cross-point control consisting of two parts, that a first part is arranged for switching the broadband signals and a second part is arranged for switching the narrow-band channels multiplexed into a broadband channel.

3. A switching system for broadband and narrow-band channels as claimed in claim 1 or 2, characterized in that the outgoing time switching stages each comprise a data store and a data store control, that the control is formed in two parts, that a first part is arranged for switching the broadband signals and a second part is arranged for switching the narrow-band channels multiplexed in a broadband channel, that the two partial controls cooperate in time-division multiplex and that the outputs of the outgoing time switching stages are connectable to subscriber's lines for transmitting in time-division multiplex a plurality of broadband and one or more narrow-band channels.

4. A switching system for broadband and narrow-band channels as claimed in claim 1, characterized in that the switching system includes an expansion stage, which stage is arranged between the space switching stage(s) and the outgoing time switching stage(s).

5. A time switching stage for broadband and narrow-band channels, as input end being arranged for receiving broadband and narrow-band channels and a time-division multiplex signal being generated at an output end, characterized in that the time switching stage comprises a first addressable data store and first routing memory coupled thereto, a second addressable data stores and a second routing memory coupled thereto, that the second data store has inputs for connecting narrow-band channels and that narrow-band channels multiplexed into broadband channels are generated at the outputs of the second data store, that the first data store has first inputs for connecting broadband signal sources and second inputs for connecting narrow-band channels multiplexed into broadband channels, and that outputs of the second data store are connected to the second inputs of the first data store.

6. A space switching stage for broadband and narrow-band channels, time-division multiplex distributed broadband and narrow-band signals being applied to an input end and the space switching stage comprising cross-point switches in a matrix configuration and each column of cross-point switches being connected to a cross-point control, characterized in that the cross-point control comprises first and second cross-point table memories and a multiplex switch, that the first memory contains cross-point switching information for the broadband channels, that the second memory contains cross-point switching information for the narrow-band channels, that the output of an first memory is connected to a first change-over contact of the multiplex switch, that an output of the second memory is connected to a second change-over contact of the multiplex switch, and that the fixed contact of the multiplex switch is connected to the cross-points associated with a column of the cross-point matrix.

7. A time switching stage for broadband and narrow-band channels, an input thereof being arranged for receiving time-division multiplex distributed broadband and narrow-band channels and the time switching stage comprising an addressable data store including an addressing portion, characterized in that the time switching stage comprises first and second time switching table memories and a multiplex switch, that the first memory contains time slot switching information for the broadband channels, that the second memory contains slot switching information for the narrow-band channels, that an output of the first memory is connected to a first change-over contact of the multiplex switch, that an output of the second memory is connected to a second change-over contact of the multiplex switch, and that the fixed contact of the multiplex switch is coupled to the addressing portion of the addressable information store.

* * * * *